United States Patent
Hashimoto (10) Patent No.: US 11,040,803 B2
(45) Date of Patent: Jun. 22, 2021

(54) LAMINATED TUBE CONTAINER

(71) Applicant: YOSHINO KOGYOSHO CO., LTD., Tokyo (JP)

(72) Inventor: Kazuhiro Hashimoto, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 40 days.

(21) Appl. No.: 16/489,591

(22) PCT Filed: Jan. 22, 2018

(86) PCT No.: PCT/JP2018/001786
§ 371 (c)(1),
(2) Date: Aug. 28, 2019

(87) PCT Pub. No.: WO2018/173451
PCT Pub. Date: Sep. 27, 2018

(65) Prior Publication Data
US 2019/0389629 A1  Dec. 26, 2019

(30) Foreign Application Priority Data
Mar. 24, 2017 (JP) ............................. JP2017-059885

(51) Int. Cl.
*B65D 35/04* (2006.01)
*B32B 15/085* (2006.01)
(Continued)

(52) U.S. Cl.
CPC ............ *B65D 35/04* (2013.01); *B32B 15/085* (2013.01); *B32B 15/09* (2013.01); *B32B 15/20* (2013.01);
(Continued)

(58) Field of Classification Search
CPC ........ A45D 34/00; B65D 35/04; B65D 35/10; B65D 35/14; B65D 65/40; B65D 65/42;
(Continued)

(56) References Cited

U.S. PATENT DOCUMENTS 4,733,800 A * 3/1988 Bjorkengren ....... B29C 65/4815
222/107
5,165,988 A * 11/1992 Schaefer ................. B32B 15/08
428/220
(Continued)

FOREIGN PATENT DOCUMENTS

| JP | S6186258 A | 5/1986 |
| JP | H02-24760 Y2 | 7/1990 |

(Continued)

OTHER PUBLICATIONS

English Translation of the Description of JP 2000153585A from Espacenet website by Andrew Bainbridge on Oct. 19, 2020, pp. 1-3. (Year: 2020).*
(Continued)

*Primary Examiner* — Paul R Durand
*Assistant Examiner* — Andrew P Bainbridge
(74) *Attorney, Agent, or Firm* — Oliff PLC (57) ABSTRACT

The laminated tube container has a tube body that includes a light blocking layer between an innermost layer and an outermost layer made of resin. The tube body has a butted portion in which both side edges of a laminated sheet constituting the tube body butt against each other and a reinforcing tape portion provided on an inner surface of the tube body along the butted portion. The reinforcing tape portion has a pair of resin layers and an intermediate layer that includes an aluminum layer and is disposed between the pair of resin layers.

11 Claims, 8 Drawing Sheets

(51) Int. Cl.
  *B32B 15/20* (2006.01)
  *B32B 27/32* (2006.01)
  *B32B 27/36* (2006.01)
  *B32B 15/09* (2006.01)
  *B65D 65/40* (2006.01)

(52) U.S. Cl.
  CPC .............. *B32B 27/32* (2013.01); *B32B 27/36* (2013.01); *B65D 65/40* (2013.01); *B32B 2307/71* (2013.01); *B32B 2439/40* (2013.01)

(58) Field of Classification Search
  CPC ..... B32B 27/32; B32B 27/36; B32B 2307/71; B32B 2439/40; B32B 1/08; B32B 15/08; B32B 15/085; B32B 15/09; B32B 15/20
  USPC ........................................................ 222/107
  See application file for complete search history.

(56) References Cited

U.S. PATENT DOCUMENTS

| | | | |
|---|---|---|---|
| 8,852,705 B2 * | 10/2014 | Thomasset | B29C 65/5021 428/57 |
| 8,916,247 B2 * | 12/2014 | Thomasset | B32B 3/08 428/35.7 |
| 9,352,881 B2 * | 5/2016 | Medico | B29C 66/1142 |
| 10,160,580 B2 * | 12/2018 | Suter | B32B 7/12 |
| 2004/0009345 A1 * | 1/2004 | Hummel | B32B 3/30 428/332 |
| 2005/0156359 A1 * | 7/2005 | Serrano | B29C 49/00 264/514 |
| 2015/0336726 A1 | 11/2015 | Suter et al. | |
| 2017/0253387 A1 * | 9/2017 | Patel | B29C 45/0001 |

FOREIGN PATENT DOCUMENTS

| | | | |
|---|---|---|---|
| JP | H07-041020 A | | 2/1995 |
| JP | 2000-153585 A | | 6/2000 |
| JP | 2000153585 A | * | 6/2000 |
| JP | 2007-076698 A | | 3/2007 |
| JP | 2010-235160 A | | 10/2010 |
| JP | 2010235160 A | * | 10/2010 |
| KR | 101355847 B1 | | 1/2014 |

OTHER PUBLICATIONS

English Translation of the Description of JP 2010235160A from Espacenet website by Andrew Bainbridge on Oct. 19, 2020, pp. 1-36. (Year: 2020).*
Mar. 20, 2018 International Search Report issued in International Patent Application No. PCT/JP2018/001786.
Sep. 24, 2019 International Preliminary Report on Patentability issued in International Patent Application No. PCT/JP2018/001786.
Jul. 1, 2020 Office Action issued in Chinese Patent Application No. 201880014461.0.
Feb. 26, 2021 European Extended Search Report issued in European Patent Application No. 18770436.6.
Oct. 12, 2020 Office Action issued in Korean Patent Application No. 10-2019-7025135.
Mar. 30, 2021 Office Action issued in Japanese Patent Application No. 2017-059885.

* cited by examiner

LAMINATED TUBE CONTAINER

TECHNICAL FIELD

The present disclosure relates to a laminated tube container having a tube body formed by a laminated sheet.

BACKGROUND

Laminated tube containers have been widely used as containers configured to contain toiletries such as hair rinses, hair treatments, toothpastes and the like and paste seasonings.

The laminated tube container has a tube body formed by a laminated sheet that includes a light blocking layer such as an aluminum layer disposed between an innermost layer and an outermost layer, the innermost layer and the outermost layer being formed by a resin material such as polyethylene, for example. One end of the tube body is integrally provided with a resin head that includes a shoulder and a mouth portion protruding from the shoulder and the other end of the tube body is crushed flat and closed. In this manner, the tube container is formed into a container that can contain content. The tube body is flexible, and the content contained in the tube body can be pushed out and thus extracted from the mouth portion to the outside by squeezing the tube body by hand.

The tube body constituting the above described laminated tube container is manufactured in the following manner; a belt-like laminated sheet is rolled so that the both side edges thereof butt against each other, the butted portion is bonded by means of welding or adhesion to form the laminated sheet into a tube shape, and the laminated sheet formed into a tube shape is cut into a predetermined length. In this case, in order to reinforce the bonding portion of both side edges of the tube body, it is common that a resin reinforcing tape is attached to the inner surface of the tube body along the butted portion (see Patent Literature 1 (PTL 1)).

CITATION LIST

Patent Literature

PTL 1: JPH0741020A

SUMMARY

Technical Problem

In the above described conventional laminated tube container, a tube body is provided with a light blocking layer such as an aluminum layer to ensure light blocking properties, and deterioration or alteration or the like of the content contained in the tube body caused by contact thereof with light is prevented.

However, the bonded area of the bonding portion on both side edges of the laminated sheet constituting the tube body is small, and the bond is occasionally detached and butted portions on both side edges are connected only by a reinforcing tape. In this case, the reinforcing tape has no light blocking properties, which causes a gap between both side edges where bond therebetween has been detached. As a result the light blocking properties of the tube body is decreased.

In view of the above described problem, the object of the present disclosure is to provide a laminated tube container capable of ensuring light blocking properties at a butted portion of a tube body.

Solution to Problem

The laminated tube container according to the present disclosure is a laminated tube container having a tube body that includes a light blocking layer between an innermost layer and an outermost layer made of resin. The tube body has a butted portion in which both side edges of a laminated sheet constituting the tube body butt against each other; and a reinforcing tape portion provided on an inner surface of the tube body along the butted portion. The reinforcing tape portion has a pair of resin layers and an intermediate layer that includes an aluminum layer and is disposed between the pair of resin layers.

In the laminated tube container according to the present disclosure configured in the above described manner, preferably, a resin cover portion configured to cover both side edges of the intermediate layer is provided on both sides of the reinforcing tape portion.

In the laminated tube container according to the present disclosure configured in the above described manner, preferably, the cover portion is integrally provided with at least one of the resin layers.

In the laminated tube container according to the present disclosure configured in the above described manner, preferably, the color of the cover portion is different from that of the resin layer on the side exposed to the inside of the tube body and the intermediate layer.

In the laminated tube container according to the present disclosure configured in the above described manner, preferably, the innermost layer and the outermost layer of the tube body are made of polyethylene, and each of the pair of resin layers of the reinforcing tape portion is a polyethylene layer.

In the laminated tube container according to the present disclosure configured in the above described manner, preferably, the intermediate layer includes a polyethylene terephthalate layer.

In the laminated tube container according to the present disclosure configured in the above described manner, preferably, the light blocking layer is an aluminum layer.

In the laminated tube container according to the present disclosure configured in the above described manner, preferably, one end of the tube body is integrally provided with a resin head that includes a shoulder and a mouth portion protruding from the shoulder and the other end thereof is crushed flat and closed.

Advantageous Effect

According to the present disclosure, a laminated tube container capable of ensuring light blocking properties in the butted portion of the tube body is provided.

DETAILED DESCRIPTION

The present disclosure will be illustrated in more detail below with reference to drawings.

A laminated tube container 1 according to an embodiment of the present disclosure illustrated in FIGS. 1 to 4 is used for applications of a container that contains toiletries such as hair rinses, hair treatments, toothpastes and the like and paste seasonings as content. The laminated tube container 1 has a tube body 10 and a head 20.

Figure 2:
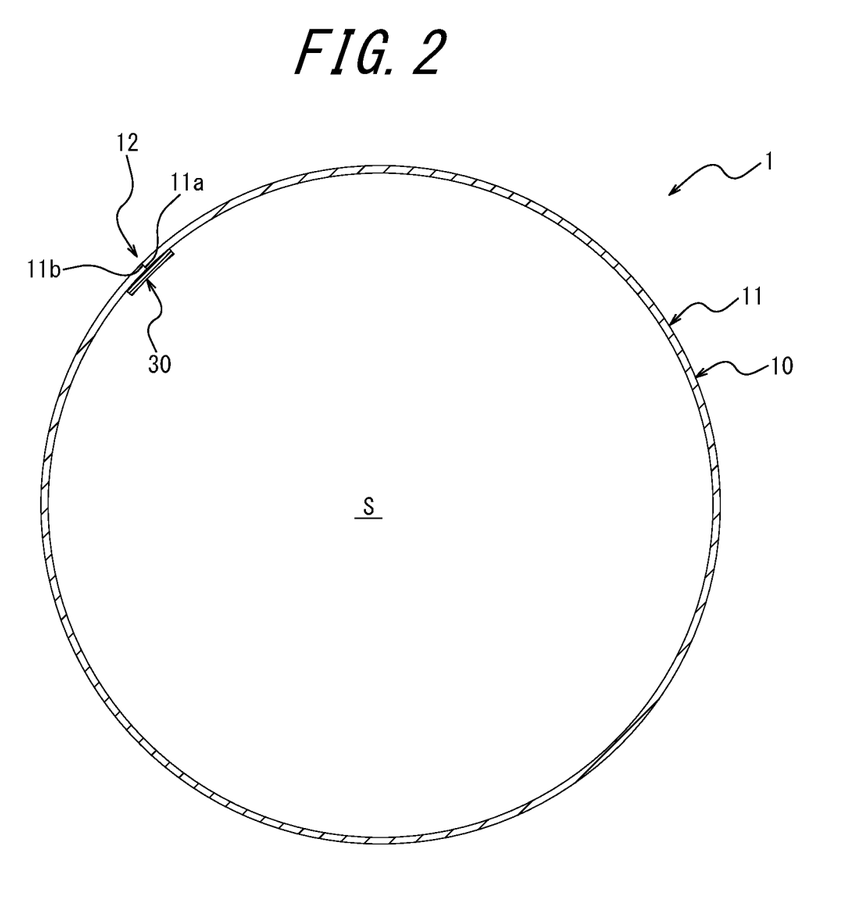
FIG. 2 is a cross-sectional view taken from A-A line of the laminated tube container illustrated in FIG. 1.

The tube body 10 is formed into a substantially cylindrical shape by rolling a laminated sheet 11 formed into a belt-like shape so that both side edges 11a and 11b thereof butt against each other and by bonding, in a butted portion 12, the both side edges 11a and 11b to each other by means of welding, adhesion, and the like. As illustrated in FIG. 2, in the present embodiment, although the tube body 10 has a substantially cylindrical shape, it may have an elliptical-cylindrical shape as far as it is substantially tubular.

Figure 3:
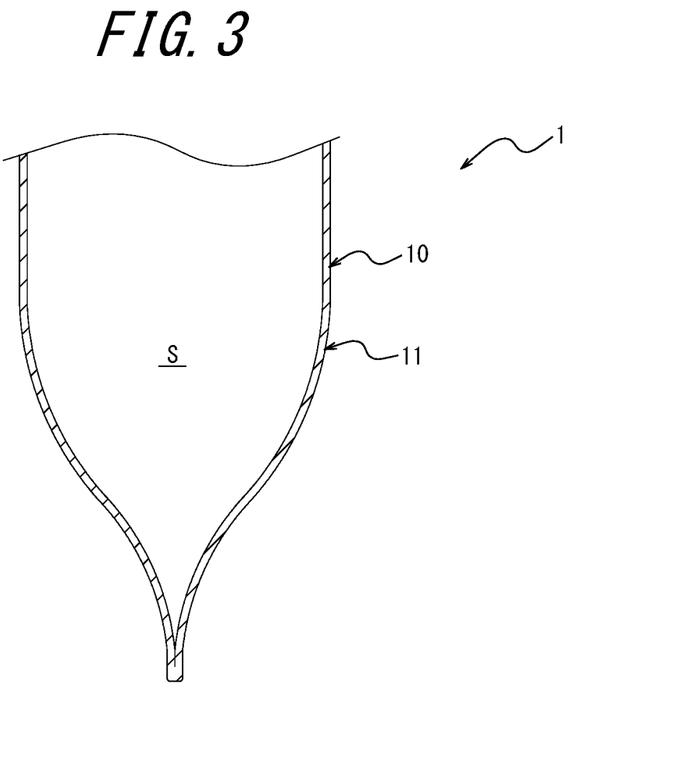
FIG. 3 is a sectional side view of a lower end of the laminated tube container illustrated in FIG. 1.

As illustrated in FIG. 3, one end of the tube body 10 is crushed flat and the crushed portion is closed by welding. In this manner, the tube body 10 is formed into a substantially cylindrical shape in which the butted portion 12 between side edges 11a and 11b of the laminated sheet 11 constituting the tube body 10 extends from one end to the other end in the axial direction, and since one end of the tube body 10 is crushed flat and closed, the tube body 10 is also formed into a shape that includes an accommodation space S for content.

Figure 4:
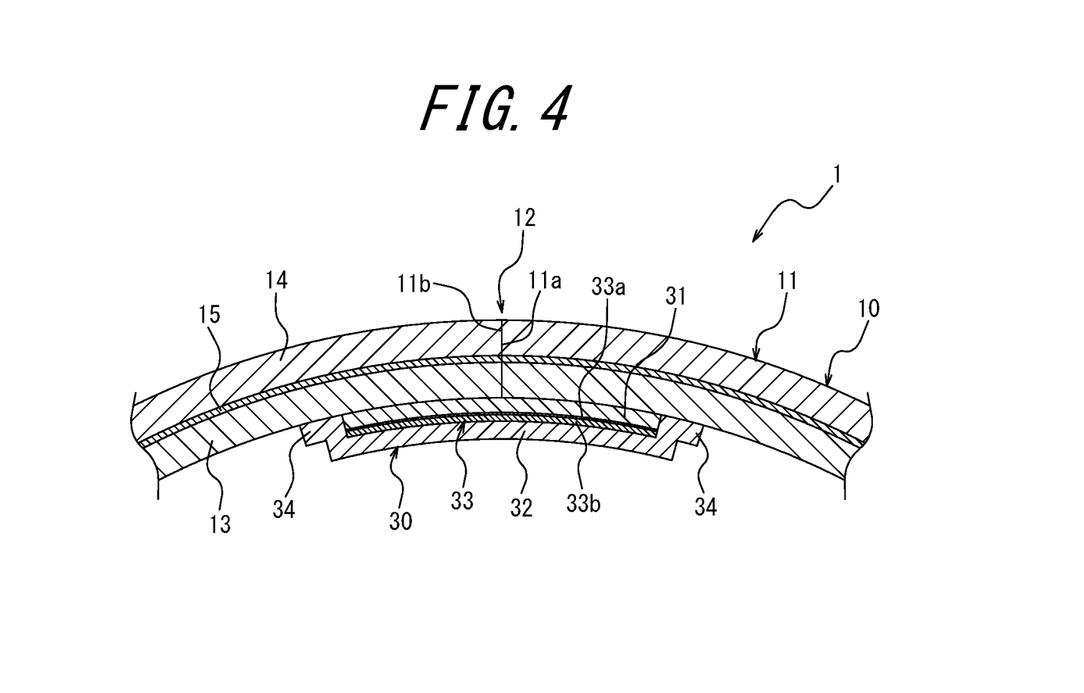
FIG. 4 is an enlarged cross-sectional view of a bonding portion of the tube body illustrated in FIG. 2.

As illustrated in FIG. 4, the tube body 10 has a laminated structure that includes an aluminum layer (AL layer) 15, as a light blocking layer, disposed between an innermost layer 13 made of polyethylene and an outermost layer 14 also made of polyethylene(PE), and is flexible enough to be easily deformed by hand. The tube body 10 includes the aluminum layer 15 as a light blocking layer, and thus has high light blocking properties and barrier properties.

Although use of a linear low-density polyethylene (LLDPE) may be preferable as a polyethylene constituting the innermost layer 13 and the outermost layer 14, other types of polyethylene may be used. The light blocking layer is not limited to the above described aluminum layer 15, and it may be other layers having light blocking properties, such as a polyethylene terephthalate (PET) layer with silver print all over the surface thereof by a vapor deposition, for example.

A variety of layer structures may be adopted as a laminated structure of the tube body 10 as far as at least a light blocking layer is provided between the innermost layer 13 and the outermost layer 14 made of polyethylene. For example, in addition to the light blocking layer, other polyethylene layers such as a polyethylene terephthalate layer and a low-density polyethylene (LDPE) may be provided between the innermost layer 13 and the outermost layer 14. In any layer structures, an adhesion layer such as an anchor coat layer and a dry laminate layer may be further provided to improve adhesion properties between layers.

Figure 1:
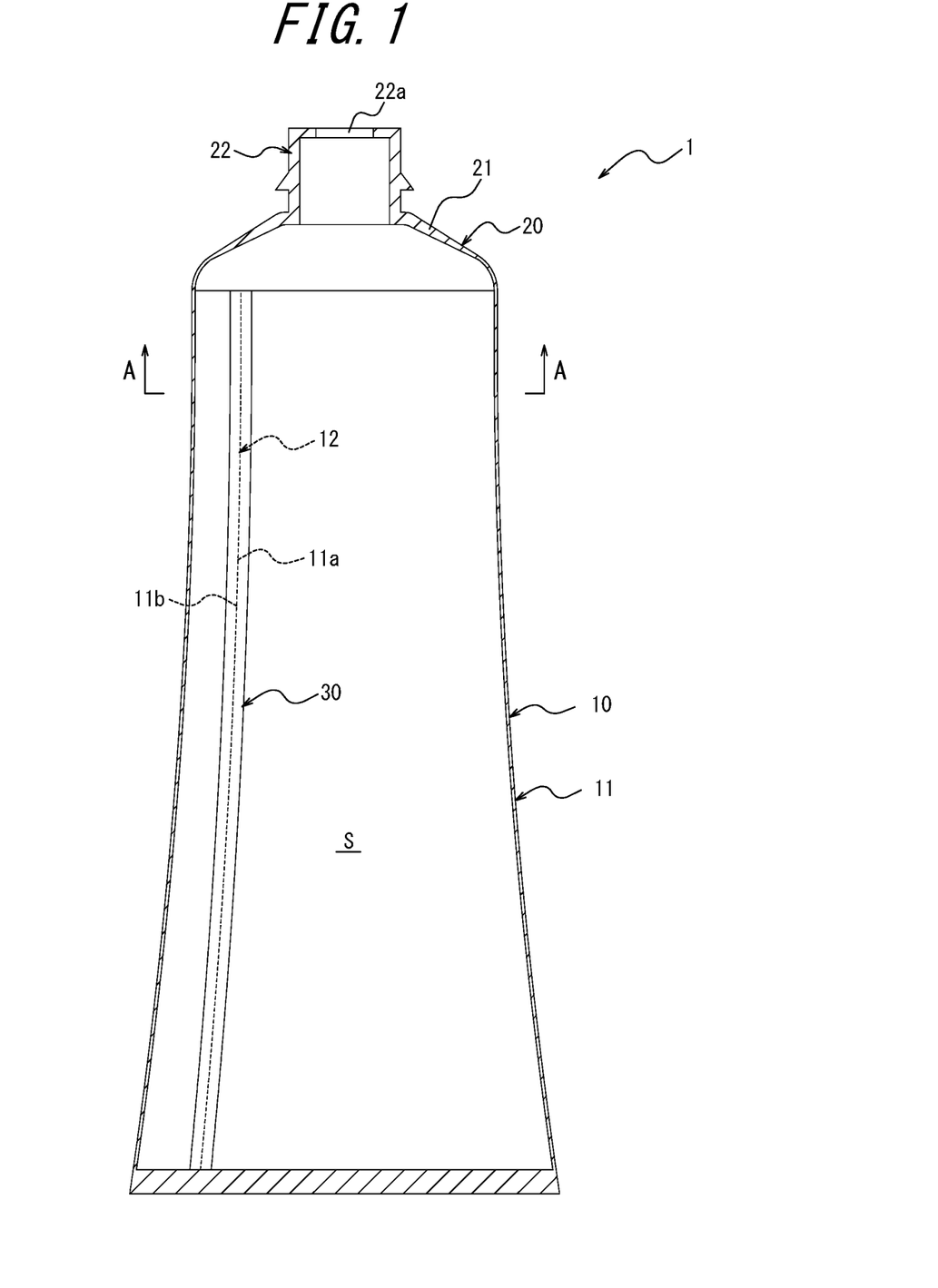
FIG. 1 is a cross-sectional view of a laminated tube container according to an embodiment of the present disclosure.

As illustrated in FIG. 1, the head 20 is made of polyethylene, and has a shoulder 21 formed into a shade. The head 20 is provided to the tube body 10 integrally and continuously through welding of the outer peripheral edge of the shoulder 21 over the entire circumference of one end of the tube body 10. A cylindrical mouth portion 22 is protruded outward from the central portion of the shoulder 21. The top end of the mouth portion 22 is formed as a spout 22a from which the content is poured. With the above described head 20, by squeezing the tube body by hand, the content contained in the accommodation space S can be pushed out from the spout 22a of the mouth portion 22, thus can be extracted easily.

Although not illustrated in detail, the mouth portion 22 may be provided with a member such as a spout cap with a lid and the like.

In order to reinforce the bonding portion of the butted portion 12 in the tube body 10, a reinforcing tape portion 30 is provided on an inner surface of the tube body 10 along the butted portion 12.

As illustrated in FIG. 4, the reinforcing tape portion 30 has, as a resin layer, an outer polyethylene layer (PE layer) 31 in contact with an inner surface of the tube body 10 and an inner polyethylene layer (PE layer) 32 exposed to the accommodation space S of the tube body 10. The reinforcing tape portion 30 also has an intermediate layer 33 between a pair of polyethylene layers 31 and 32. The outer polyethylene layer 31 is welded to the inner surface of the polyethylene innermost layer 13 of the tube body 10, and consequently the reinforcing tape portion 30 is attached to the inner surface of the tube body 10 as it bridges over both side edges 11a and 11b of the butted portion 12. Although a linear low-density polyethylene (LLDPE) may preferably be used as a polyethylene constituting the outer polyethylene layer 31 and the inner polyethylene layer 32, other types of polyethylene such as a low-density polyethylene (LDPE) and the like may be used.

It is to be noted that, the reinforcing tape portion 30 may be attached to the inner surface of the innermost layer 13 of the tube body 10 by adhesion, instead of welding.

As illustrated in FIG. 1, the reinforcing tape portion 30 extends from one end being continuous with the head 20 of the tube body 10 to the closed other end along the butted portion 12, and is attached to the inner surface of the tube body 10 by bridging over both side edges 11a and 11b over the entire range of the butted portion 12 in the longitudinal direction. In this manner, bonding of the butted portion 12 of the tube body 10 is reinforced by the reinforcing tape portion 30 and, even if bonding of both side edges 11a and 11b is detached in the butted portion 12, the butted portion 12 is kept connected by the reinforcing tape portion 30, and thus the content is prevented from leaking from that portion.

As illustrated in FIG. 4, the intermediate layer 33 includes an aluminum layer (AL layer) 33a and a polyethylene terephthalate layer (PET layer) 33b. Since the intermediate layer 33 includes the aluminum layer 33a, the reinforcing tape portion 30 has high light blocking properties. Therefore, even if the bonding of both side edges 11a and 11b is detached in the butted portion 12 and the butted portion 12 of the both side edges 11a and 11b is connected only by the reinforcing tape portion 30, which causes a gap between both side edges 11a and 11b where bonding is detached, the reinforcing tape portion 30 having the light blocking properties enables the tube body 10 to ensure the light blocking properties at a portion where bonding of both side edges 11a and 11b is detached.

In this manner, according to the laminated tube container 1 of the present embodiment, the reinforcing tape portion 30 provided along the butted portion 12 of the tube body 10 includes the aluminum layer 33a. Thus, even if the bonding of both side edges 11a and 11b of the butted portion 12 is detached, the light blocking properties can be reliably ensured in the butted portion 12 of the tube body 10. In this manner, the content contained in the accommodation space S of the tube body 10 is reliably prevented from being deteriorated or altered when it is exposed to light.

Furthermore, in the laminated tube container 1 according to the present embodiment, in addition to the aluminum layer 33a, the polyethylene terephthalate layer 33b is provided to the reinforcing tape portion 30 disposed along the butted portion 12 of the tube body 10. In this manner, the strength of the reinforcing tape portion 30 is increased and bonding of both side edges 11a and 11b in the butted portion 12 can be more reliably reinforced.

The laminated structure of the reinforcing tape portion 30 is not limited to the above described structures, and a variety of layer structures can be adopted as far as at least light blocking layer such as the aluminum layer 33a is provided. For example, a low-density polyethylene layer (LDPE layer) formed by extrusion molding may be provided between the outer polyethylene layer 31 and the aluminum layer 33a. Moreover, in any layer structures, in order to increase adhesion between layers, an adhesion layer such as an anchor layer and a dry laminate layer may be further provided.

The content contained in the accommodation space S of the tube body 10 includes those whose quality is degraded due to a change in color thereof when being in contact with the aluminum layer 33a and those eroding the aluminum layer 33a. In order to enable the container to be used in an application in which the above described content is contained, the laminated tube container 1 according to the present embodiment is provided with a cover portion 34 on each of both sides of the reinforcing tape portion 30 as illustrated in FIG. 4.

As with the polyethylene layer 32 constituting the reinforcing tape portion 30, the cover portion 34 is made of polyethylene. The cover portion 34 is integrally formed with the inner side polyethylene layer 32 and covers both circumferential side edges of the intermediate layer 33 over the entire range in the longitudinal direction. The cover portion 34 is also welded to the inner surface of the innermost layer 13 of the tube body 10. In other words, as for the aluminum layer 33a constituting the intermediate layer 33, both side edges thereof exposed from between the polyethylene layers 31 and 32 are covered with the cover portion 34, and is separated from the accommodation space S. In this manner, the content contained in the accommodation space S is prevented from being in contact with the aluminum layer 33a, and quality degradation due to a change in color or the like of the content can be prevented.

In this manner, in the laminated tube container 1 according to the present embodiment, both side edges of the aluminum layer 33a provided to the reinforcing tape portion 30 are covered with the cover portion 34, and as a result, the light blocking properties of the tube body 10 can be improved by adopting the reinforcing tape portion 30 having the aluminum layer 33a, and quality degradation due to a change in color of the content can be prevented by preventing the content from being in contact with the aluminum layer 33a.

The tube body 10 provided with the reinforcing tape portion 30 having the cover portion 34 can be manufactured by the following procedure.

Figure 5:
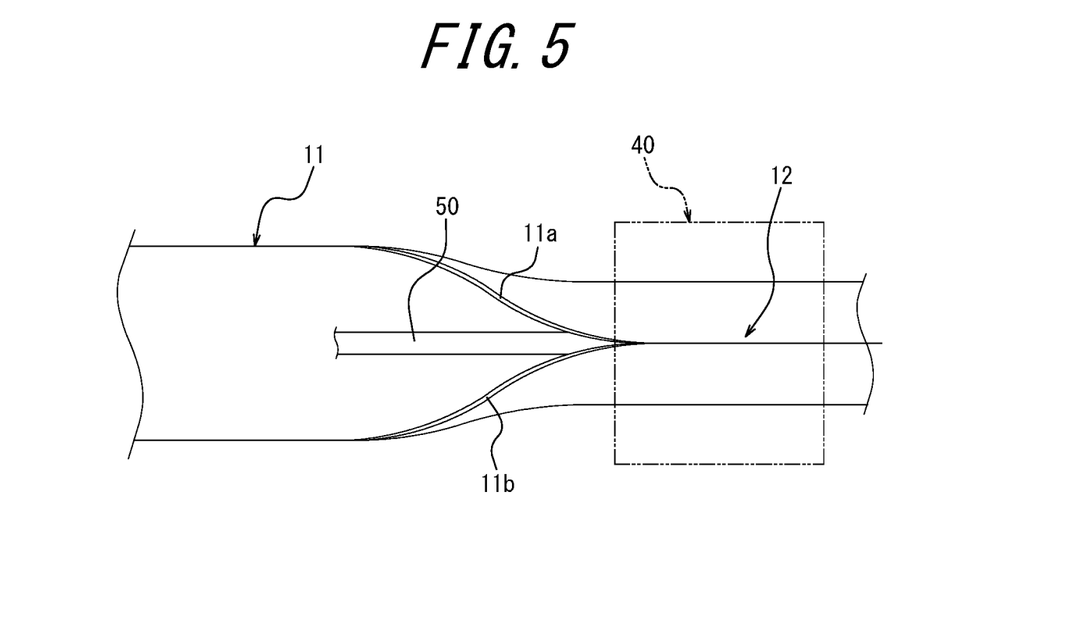
FIG. 5 is a diagram schematically illustrating a manufacturing process of the tube body.

First, as illustrated in FIG. 5, the belt-like laminated sheet 11 transferred toward a molding apparatus 40 is rolled by the molding apparatus 40 such that both side edges 11a and 11b thereof are butted against each other. Then both side edges 11a and 11b are welded in the butted portion 12 to form the tube body 10 having a substantially cylindrical shape. Furthermore, a reinforcing tape 50 is fed from a feeder toward the inside of the tube body 10 formed into a substantially cylindrical shape, and the reinforcing tape 50 is attached, by welding, to the inner surface of the tube body 10, along the butted portion 12 of both side edges 11a and 11b.

Figure 6A:
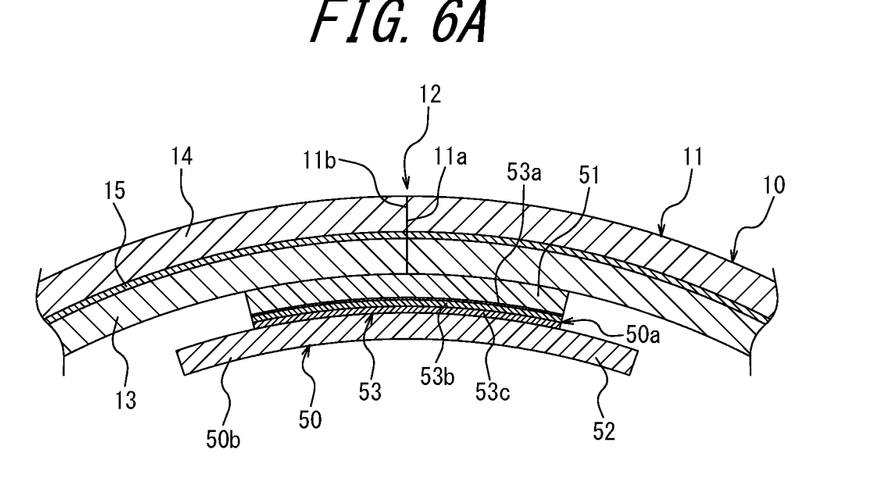
FIG. 6A is a cross-sectional view illustrating a molding procedure of a reinforcing tape portion.

In this context, as illustrated in FIG. 6A, the reinforcing tape 50 has an outer polyethylene layer 51 corresponding to the polyethylene layer 31 of the reinforcing tape portion 30, an inner polyethylene layer 52 corresponding to the polyethylene layer 32 of the reinforcing tape portion 30 and the intermediate layer 53 corresponding to the intermediate layer 33 of the reinforcing tape portion 30. The intermediate layer 53 has an aluminum layer 53a and a polyethylene terephthalate layer 53b corresponding, respectively, to the aluminum layer 33a and the polyethylene terephthalate layer 33b of the intermediate layer 33. The intermediate layer 53 has a polyethylene layer 53c further inside the polyethylene terephthalate layer 53b. When the reinforcing tape 50 is welded to the inner surface of the tube body 10, the polyethylene layer 53c integrates with the polyethylene layer 52 and constitutes, with the polyethylene layer 52, the polyethylene layer 32 of the reinforcing tape portion 30.

Although the outer polyethylene layer 51 and the intermediate layer 53 have the same circumferential width, the reinforcing tape 50 has a sectional shape in which the inner polyethylene layer 52 has a circumferential width wider than that of the outer polyethylene layer 51 and the intermediate layer 53.

Figure 7:
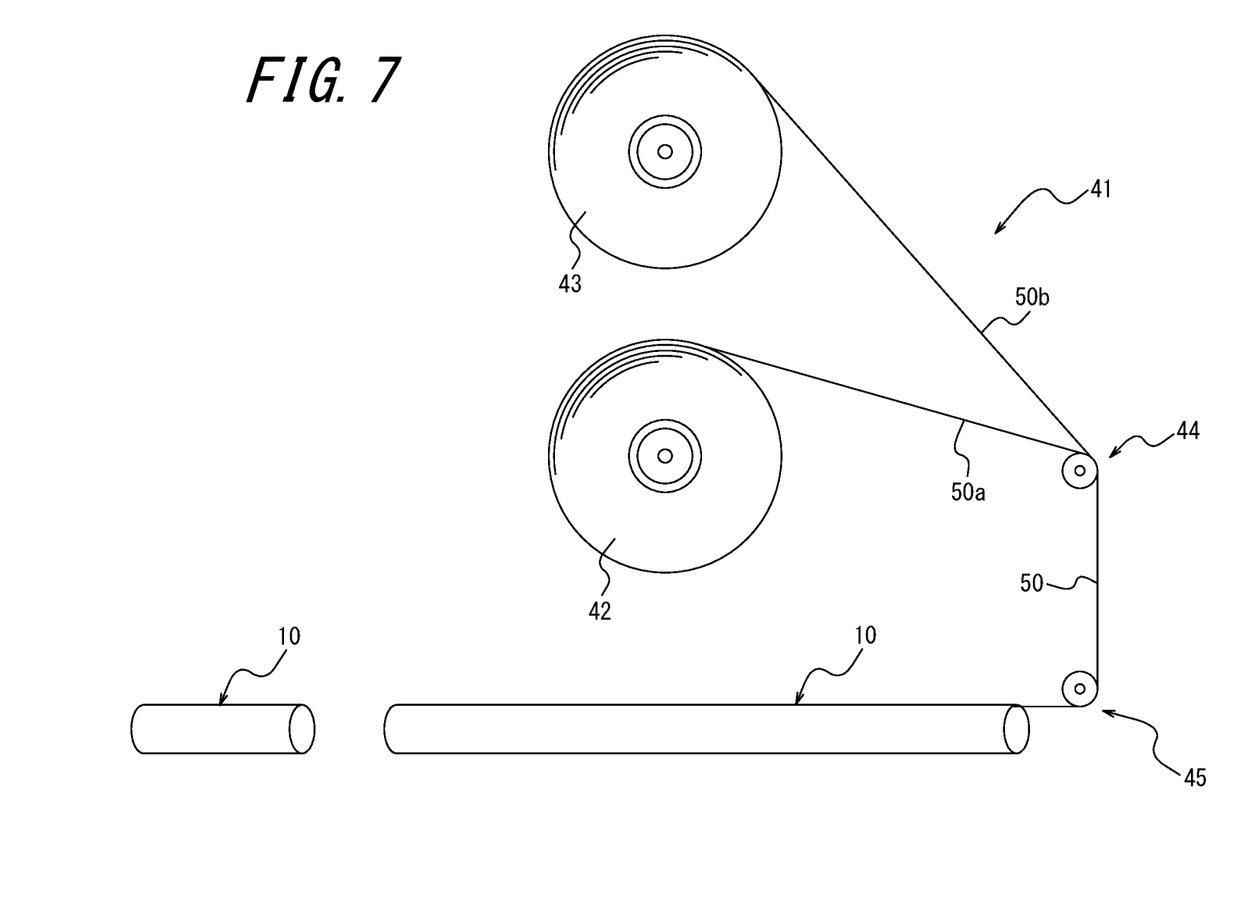
FIG. 7 is a diagram schematically illustrating an apparatus configured to feed the reinforcing tape illustrated in FIG. 6.

The above described reinforcing tape 50 can be fed to the tube body 10 by using a feeder 41 of the reinforcing tape 50 as illustrated in FIG. 7. In other words, the feeder 41 has two rolls 42 and 43. The roll 42 feeds a tape body 50a having a laminated structure in which the intermediate layer 53 is laminated on the outer polyethylene layer 51 in advance and the roll 43 feeds a tape body 50b made of polyethylene with a width larger than that of the tape body 50a corresponding to the inner polyethylene layer 52. The tape body 50a fed from the roll 42 and the tape body 50b fed from the roll 43 are overlaid on top of one another when they are passed through a guide roller 44, and are formed into the reinforcing tape 50 having a sectional shape illustrated in FIG. 6A. The reinforcing tape 50 formed in the above described manner is fed to the inside of the tube body 10 formed into a substantially cylindrical shape through the guide roller 45 and is welded to the inner surface of the tube body 10. Further, the reinforcing tape 50 is welded to the inner surface of the tube body 10, and the tape body 50a and the tape body 50b are integrated. In this manner the reinforcing tape portion 30 is formed. In this context, the innermost side of the intermediate layer 53 is provided with the polyethylene layer 53c, which allows, at the polyethylene layer 53c, the tape body 50a to be tightly welded to the polyethylene layer 52 of the tape body 50b. In this manner, the tape body 50a and the tape body 50b are integrated in a reliable manner.

Figure 6B:
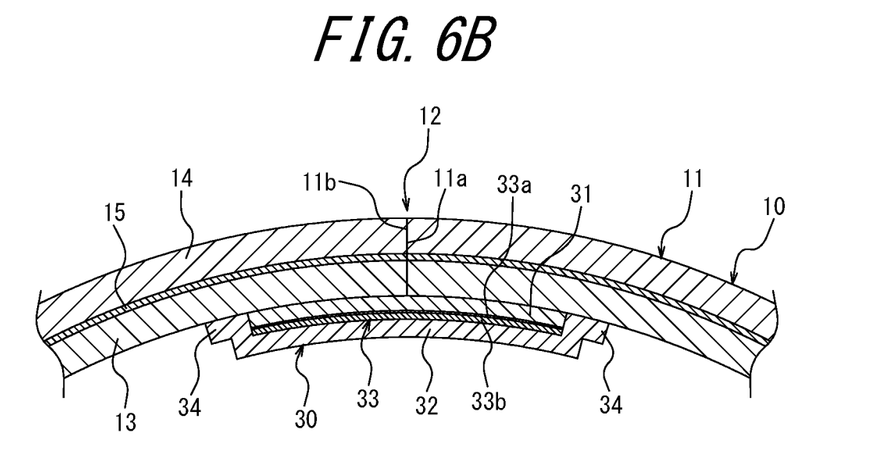
FIG. 6B is a cross-sectional view illustrating a molding procedure of a reinforcing tape portion.

The reinforcing tape 50 fed to the inner surface of the tube body 10 by using the feeder 41 is pushed against the inner surface of the tube body 10 while being heated up to a predetermined temperature by the molding apparatus 40, and welded to the butted portion 12 of both side edges 11a and 11b. In this context, since the circumferential width of the inner polyethylene layer 52 of the reinforcing tape 50 is wider than that of the outer polyethylene layer 51 and the intermediate layer 53, a portion of the inner polyethylene layer 52 protruded outward in the circumferential direction with respect to the circumferential end portion of the intermediate layer 53 is welded to the inner surface of the tube body 10 while being deformed such that it covers the circumferential end portion of the intermediate layer 53. According to the above described molding procedure, as illustrated in FIG. 6B, the reinforcing tape portion 30 being integrally continuous with the polyethylene layer 32 and provided with the cover portion 34 covering both side edges of the intermediate layer 33 can be easily and reliably formed on the inner surface of the tube body 10 along the butted portion 12.

It is to be noted that the tube body 10 having an inner surface attached with the reinforcing tape portion 30 is thereafter cut into a predetermined length and one end thereof is crushed flat and closed.

Figure 8A:
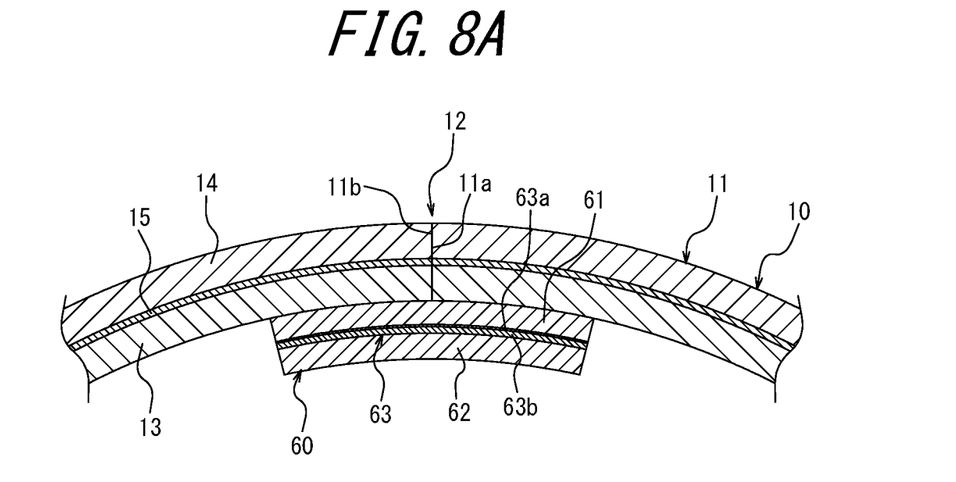
FIG. 8A is a cross-sectional view illustrating another molding procedure of the reinforcing tape portion.
Figure 8B:
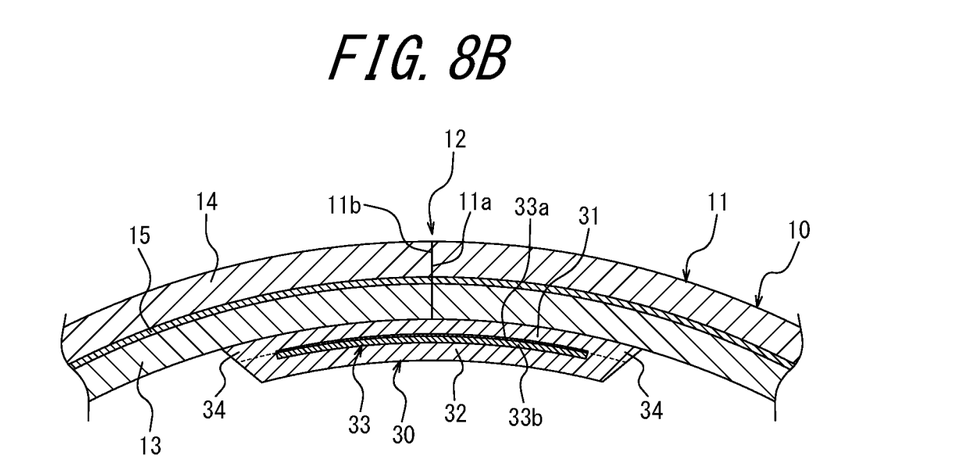
FIG. 8B is a cross-sectional view illustrating another molding procedure of the reinforcing tape portion.
Figure 9:
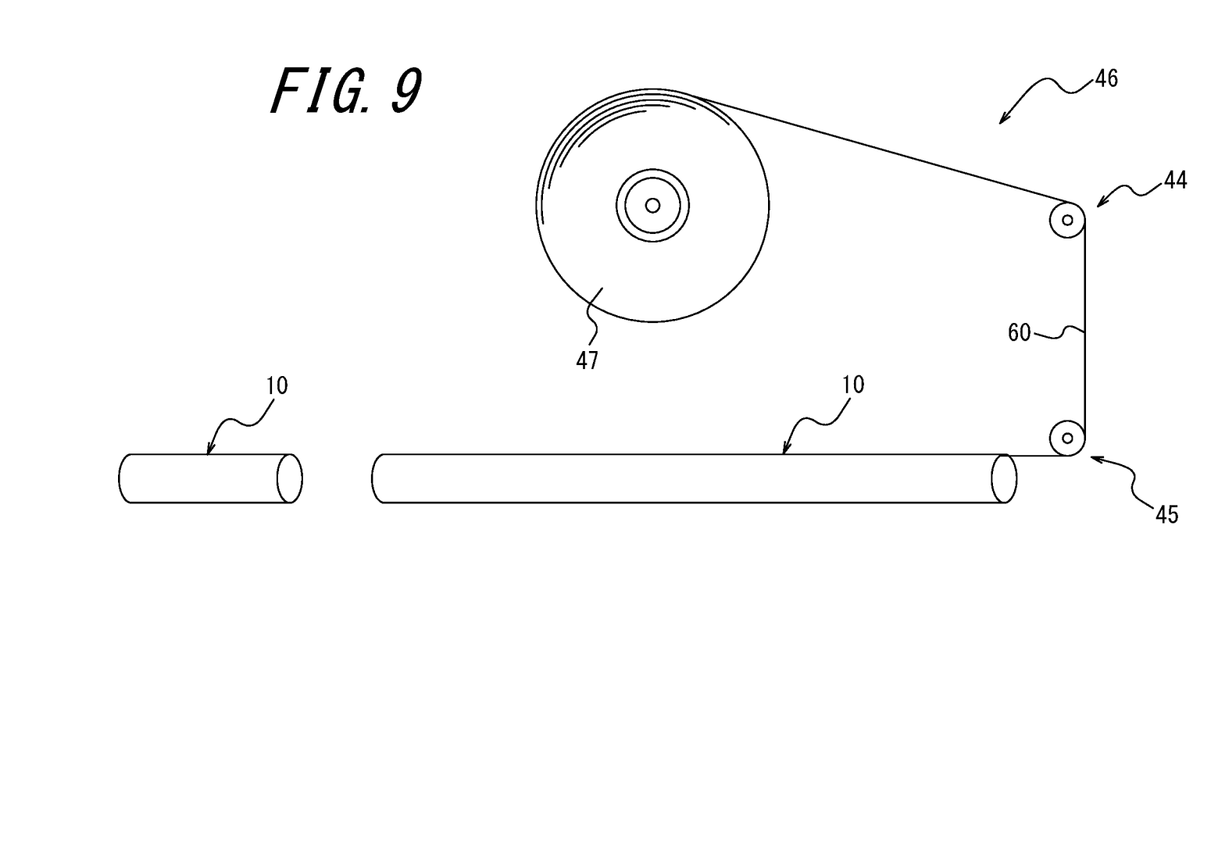
FIG. 9 is a diagram schematically illustrating an apparatus configured to feed a reinforcing tape illustrated in FIG. 8.

FIGS. 8A and 8B are cross-sectional views each illustrating another molding procedure of the reinforcing tape portion, and FIG. 9 is a schematic diagram of an apparatus configured to feed the reinforcing tape illustrated in FIG. 8. In FIGS. 8 and 9, the members corresponding to the above described members are assigned with the same reference signs.

The reinforcing tape portion 30 having the cover portion 34 can be molded in accordance with the molding procedure illustrated in FIG. 8.

In the case illustrated in FIG. 8, as illustrated in FIG. 8A, a reinforcing tape 60 is used. The tape 60 has an outer polyethylene layer 61 corresponding to the polyethylene layer 31 of the reinforcing tape portion 30, an inner polyethylene layer 62 corresponding to the polyethylene layer 32 of the reinforcing tape portion 30 and an intermediate layer 63 corresponding to the intermediate layer 33 of the reinforcing tape portion 30. The intermediate layer 63 has an aluminum layer 63a and a polyethylene terephthalate layer 63b corresponding, respectively, to the aluminum layer 33a and the polyethylene terephthalate layer 33b of the intermediate layer 33.

In the reinforcing tape 60, although all of the outer polyethylene layer 61, the intermediate layer 63 and the inner polyethylene layer 62 have the same circumferential width, the intermediate layer 63 is thinner than the outer polyethylene layer 61 and the inner polyethylene layer 62.

The above described reinforcing tape 60 can be fed to the tube body 10 by using a feeder 46 of the reinforcing tape 60 illustrated in FIG. 9. The feeder 46 has a roll 47 configured to feed the reinforcing tape 60 of a laminated structure in which the intermediate layer 63 is laminated between the outer polyethylene layer 61 and the inner polyethylene layer 62 in advance, and feeds the reinforcing tape 60 fed from the roll 47 to the inside of the tube body 10 through the guide rollers 44 and 45.

The reinforcing tape 60 fed to the inner surface of the tube body 10 by using the feeder 46 is pushed against the inner surface of the tube body 10 while being heated up to a predetermined temperature by the molding apparatus 40 and welded to the butted portion 12 of both side edges 11a and 11b. In this context, as for the reinforcing tape 60, the outer polyethylene layer 61 and the inner polyethylene layer 62 are thicker than the intermediate layer 63, and therefore the outer polyethylene layer 61 and the inner polyethylene layer 62 are partially extruded toward the lateral side of the intermediate layer 63. As a result extruded portions of the outer polyethylene layer 61 and the inner polyethylene layer 62 are welded to each other and cover the circumferential end of the intermediate layer 63 and welded also to the inner surface of the tube body 10. According to the above described molding procedure, as illustrated in FIG. 8B, the reinforcing tape portion 30 being integrally continuous with both polyethylene layers 31 and 32 and provided with the cover portion 34 covering both side edges of the intermediate layer 33 can be easily and reliably formed on the inner surface of the tube body 10 along the butted portion 12.

As the above described reinforcing tape 60, a tape having a layer structure including a linear low-density polyethylene layer (30 μm)/a dry laminate layer (3 μm)/an aluminum layer (7 μm)/a dry laminate layer (3 μm)/a polyethylene terephthalate layer (12 μm)/a dry laminate layer (3 μm)/a linear low-density polyethylene layer (50 μm) and a total thickness of 108 μm (Example 1) or a tape having a layer structure including a linear low-density polyethylene layer (60 μm)/a dry laminate layer (3 μm)/an aluminum layer (7 μm)/a dry laminate layer (3 μm)/a polyethylene terephthalate layer (12 μm)/a dry laminate layer (3 μm)/a linear low-density polyethylene layer (80 μm) and a total thickness of 168 μm (Example 2) may be used. The reinforcing tape portion 30 being integrally continuous with both of the polyethylene layers 31 and 32 and provided with the cover portion 34 covering both side edges of the intermediate layer 33 can be reliably constituted by using, as the reinforcing tape 60, the tapes having the above described structure and thickness.

In the molding method illustrated in FIG. 8, the color of the outer polyethylene layer 61 of the reinforcing tape 60 may preferably be different from that of the inner polyethylene layer 62 and the intermediate layer 63. In the present embodiment, the polyethylene layer 62 and the intermediate layer 63 are colored in silver, whereas the outer polyethylene layer 61 is colored in white.

In this manner, the outer polyethylene layer 61 of the reinforcing tape 60 is colored in a color different from that of the inner polyethylene layer 62 and the intermediate layer 63, and as a result, in the cover portion 34 of the reinforcing tape portion 30 after molding, a portion molded by the outer polyethylene layer 61 can have a different color from that of the polyethylene layer 32 on the side exposed to the inside of the tube body 10 and the intermediate layer 33 of the reinforcing tape portion 30. Therefore, it can be easily confirmed that the outer polyethylene layer 61 is welded and protruded from the intermediate layer 33 in an appropriate manner and that both side edges of the intermediate layer 33 are reliably covered by the cover portion 34 by viewing the tube body 10 provided with the reinforcing tape portion 30 from inside and recognizing that the cover portion 34 has a color different from that of the polyethylene layer 32 on the side exposed to the inside of the tube body 10 and the intermediate layer 33. In particular, in the case in which the outer polyethylene layer 61 is colored in white, reliable covering of both side edges of the intermediate layer 33 by the cover portion 34 can be confirmed more clearly.

The present disclosure is not limited to the above described embodiment, and may be modified in various manners within the scope not departing from the spirit thereof.

For example, in the above described embodiment, the innermost layer 13 and the outermost layer 14 of the tube body 10 are made of polyethylene. However, they can be made of other resin materials. Further, the resin layer of the reinforcing tape portion 30 is also not limited to the polyethylene layers 31 and 32, and may be formed of the other resin materials. In this case, the cover portion 34 is also not limited to polyethylene, and may be formed of other resin materials similar to those used for the resin layer of the reinforcing tape portion 30.

In the above described embodiment, although one end of the tube body 10 is integrally provided with the head 20 that includes the shoulder 21 and the mouth portion 22 and the other end of the tube body 10 is crushed flat and closed, this is not restrictive. For example, both ends of the tube body 10 may be modified in various manners, and as the head 20, the one having the other shape may be used, for example.

Furthermore, the cover portion 34 is not limited to those formed by the molding method described in the above described embodiment, and may be formed by the other molding methods as far as the cover portion is made of polyethylene and covers both side edges of the intermediate layer 33.

REFERENCE SIGNS LIST

1 Laminated tube container
10 Tube body
11 Laminated sheet
11a Side edge
11b Side edge
12 Butted portion
13 Innermost layer
14 Outermost layer
15 Aluminum layer (light blocking layer)
20 Head
21 Shoulder
22 Mouth portion
22a Spout
30 Reinforcing tape portion
31 Polyethylene layer (resin layer)
32 Polyethylene layer (resin layer)
33 Intermediate layer
33a Aluminum layer
33b Polyethylene terephthalate layer
34 Cover portion
40 Molding apparatus
41 Feeder
42 Roll
43 Roll
44 Guide roller
45 Guide roller
46 Feeder
47 Roll
50 Reinforcing tape
50a Tape body
50b Tape body
51 Polyethylene layer
52 Polyethylene layer
53 Intermediate layer
53a Aluminum layer
53b Polyethylene terephthalate layer
53c Polyethylene layer
60 Reinforcing tape
61 Polyethylene layer
62 Polyethylene layer
63 Intermediate layer
63a Aluminum layer
63b Polyethylene terephthalate layer
S Accommodation space

The invention claimed is:

1. A laminated tube container comprising a tube body that comprises a light blocking layer between an innermost layer and an outermost layer made of resin, wherein
the tube body comprises:
a butted portion in which both side edges of a laminated sheet constituting the tube body are butted against each other; and
a reinforcing tape portion provided on an inner surface of the tube body along the butted portion, the reinforcing tape portion comprising:
a pair of resin layers; and
an intermediate layer that comprises an aluminum layer and is disposed between the pair of resin layers,
wherein the intermediate layer comprises a polyethylene terephthalate layer.

2. The laminated tube container according to claim 1, wherein on both sides of the reinforcing tape portion are provided with a resin cover portion configured to cover both side edges of the intermediate layer.

3. The laminated tube container according to claim 2, wherein the cover portion is integrally provided with at least one of the resin layers.

4. The laminated tube container according to claim 1, wherein the innermost layer and the outermost layer of the tube body are made of polyethylene, and each of the pair of resin layers of the reinforcing tape portion is a polyethylene layer.

5. The laminated tube container according to claim 1, wherein the light blocking layer is an aluminum layer.

6. The laminated tube container according to claim 1, wherein one end of the tube body is integrally provided with a resin head having a shoulder and a mouth portion protruding from the shoulder; and another end of the tube body is crushed flat and closed.

7. A laminated tube container comprising a tube body that comprises a light blocking layer between an innermost layer and an outermost layer made of resin, wherein
the tube body comprises:
a butted portion in which both side edges of a laminated sheet constituting the tube body are butted against each other; and
a reinforcing tape portion provided on an inner surface of the tube body along the butted portion, the reinforcing tape portion comprising:
a pair of resin layers; and
an intermediate layer that comprises an aluminum layer and is disposed between the pair of resin layers,
wherein on both sides of the reinforcing tape portion are provided with a resin cover portion configured to cover both side edges of the intermediate layer, and wherein a color of the cover portion is different from a color of the resin layer on a side exposed to an inside of the tube body and a color of the intermediate layer.

8. The laminated tube container according to claim 7, wherein the innermost layer and the outermost layer of the tube body are made of polyethylene, and each of the pair of resin layers of the reinforcing tape portion is a polyethylene layer.

9. The laminated tube container according to claim 7, wherein the intermediate layer comprises a polyethylene terephthalate layer.

10. The laminated tube container according to claim 7, wherein the light blocking layer is an aluminum layer.

11. The laminated tube container according to claim 7, wherein one end of the tube body is integrally provided with a resin head having a shoulder and a mouth portion protruding from the shoulder; and another end of the tube body is crushed flat and closed.

\* \* \* \* \*